United States Patent
Montestruque et al.

(12)

(10) Patent No.: US 10,113,304 B2
(45) Date of Patent: Oct. 30, 2018

(54) SYSTEM AND METHOD FOR AGENT-BASED CONTROL OF SEWER INFRASTRUCTURE

(71) Applicants: Luis Montestruque, South Bend, IN (US); Timothy Ruggaber, South Bend, IN (US)

(72) Inventors: Luis Montestruque, South Bend, IN (US); Timothy Ruggaber, South Bend, IN (US)

(73) Assignee: EMNET, LLC, South Bend, IN (US)

( * ) Notice: Subject to any disclaimer, the term of this patent is extended or adjusted under 35 U.S.C. 154(b) by 85 days.

(21) Appl. No.: 15/017,529

(22) Filed: Feb. 5, 2016

(65) Prior Publication Data

US 2016/0378123 A1    Dec. 29, 2016

Related U.S. Application Data

(60) Provisional application No. 62/113,358, filed on Feb. 6, 2015.

(51) Int. Cl.

| | |
|---|---|
| G05D 7/00 | (2006.01) |
| F17D 1/00 | (2006.01) |
| E03F 5/10 | (2006.01) |
| G05B 15/02 | (2006.01) |
| E03F 3/02 | (2006.01) |

(52) U.S. Cl.
CPC ............ *E03F 5/107* (2013.01); *G05B 15/02* (2013.01); *E03F 3/02* (2013.01)

(58) Field of Classification Search
CPC .................................................. G05D 7/0635
USPC ........................................................ 700/282
See application file for complete search history.

(56) References Cited

U.S. PATENT DOCUMENTS

| | | | | |
|---|---|---|---|---|
| 6,318,395 | B1* | 11/2001 | Anderson | E03F 5/102 137/1 |
| 6,997,201 | B2* | 2/2006 | Preul | E03F 1/00 137/1 |
| 7,792,126 | B1* | 9/2010 | Montestruque | E03F 7/00 370/386 |
| 8,220,484 | B2* | 7/2012 | Howitt | E03F 7/00 137/551 |
| 9,631,356 | B2* | 4/2017 | Nesbitt | E03F 3/00 |
| 2011/0036783 | A1* | 2/2011 | Chezar | E03F 5/101 210/744 |
| 2013/0340836 | A1* | 12/2013 | Wambold | G05D 7/0617 137/10 |

* cited by examiner

*Primary Examiner* — Suresh Suryawanshi
(74) *Attorney, Agent, or Firm* — EcoTech Law Group, P.C.

(57) ABSTRACT

The present invention is a method and system for control of sewer systems. The invention may implement ABRTC (RTC) to dynamically control of sewer systems to accomplish a desired outcome, such as CSO or SSO reduction or reduce water pollution or reduce surface flooding. In one embodiment, an Agent-Based RTC System assigns an agent to each sewer asset. Each agent measures the current state of its corresponding asset and assigns a virtual cost to any incoming flow to the asset based on the asset hydraulic or water quality state. The virtual cost is communicated to other assets upstream or downstream that may change the hydraulic or water quality state of the asset communicating the virtual cost. The network of agents may thus control the sewer to achieve the desired objective, such as asset hydraulic or water quality state.

19 Claims, 11 Drawing Sheets

SYSTEM AND METHOD FOR AGENT-BASED CONTROL OF SEWER INFRASTRUCTURE

CROSS-REFERENCE TO RELATED APPLICATIONS

This application claims the benefit of U.S. Provisional Application No. 62/113,358, filed Feb. 6, 2015, the contents of which are hereby incorporated by reference in its entirety.

BACKGROUND OF THE INVENTION

Field of the Invention

This invention relates generally to the operation of sewer systems, and more specifically to methods and devices to optimally control the flow through sewer systems.

Discussion of the Background

Sewer systems consist of a series of interconnected sewer pipes and transport wastewater by gravity with the assistance of pump stations. Sewer systems are not optimized, as becomes obvious when wet weather events such as rain or snow melts increase the amount of water travelling through the sewer system. Thus, for example, wet weather events can cause street flooding, basement flooding, sanitary and combined sewer overflows.

Thus there is a need in the art for a method and apparatus that provides for better control of sewer systems. Such a method and apparatus should be capable of responding to rainfall and other events to eliminate or reduce overflow events. Such a method and apparatus should be easy to incorporate into existing infrastructure and should be cost effective.

BRIEF SUMMARY OF THE INVENTION

The present invention is a method and system for control of sewer systems. In one embodiment, a control system is provided that includes agent-based real-time control (ABRTC) to dynamically control of sewer systems to accomplish a desired outcome, such as CSO or SSO reduction or reduce water pollution or reduce surface flooding.

A sewer asset is any physical structure or element that composes, affects, or is hydraulically connected to the sewer system. A supplying asset is a sewer asset that stores, conveys, or treats water from a demanding asset. The supplying asset may be a pipe, a treatment plant, an outfall, a tank, the receiving water body, etc. A demanding asset is a sewer asset that uses a supplying asset to store, convey, or treat the water it is carrying. A consumer asset is typically upstream of supplying assets. A demanding asset can be a supplying asset of another demanding asset further upstream. A control asset is a demanding asset that can dynamically utilize more than one supplying asset via some type of actuation (e.g. a valve). In one embodiment, an ABRTC system assigns an agent to each sewer asset. Each supplying agent has a supply curve that is used to calculate a virtual cost based on the current state of its corresponding asset. The virtual cost is assigned to any incoming flow to the asset. In one embodiment, the virtual cost is based on the supplying asset's hydraulic state or water quality state. The asset hydraulic state may be, for example and without limitation, a flow rate as measured by a flow meter, or a water level as measured by a water level meter. The water quality state may be, for example and without limitation, the concentration of a pollutant, as measured by a sensor. In one embodiment, virtual costs are optimized to achieve the desired objective (e.g. reduce overflows). A supplying agent communicates its virtual cost to its corresponding demanding agents through a computer network. A control agent distributes flows among its supplying agents to minimize the total virtual cost of such supplying agents. The network of agents may thus control the sewer to achieve the desired objective, such as asset hydraulic state or water quality state.

Certain embodiments implement ABRTC to determine the optimal operation of the entire sewer system. In particular, ABRTC includes an agent-based distributed control where each agent, representing a sewer structure, exchanges information, such as sewage capacity, with other agents of other sewer assets by mimicking a free market economy. Furthermore, each agent trades sewer capacity based on simple supply and demand economic rules designed to optimize a parameter such as minimize surface flooding or minimize sewer overflows. The method renders a distributed control algorithm that can be implemented to optimize parameters such as the aforementioned.

One advantage of ABRTC of a sewer system is that the control system is much easier to follow and understand than prior art systems in that they follow basic economic trade supply and demand principles.

Another advantage of certain embodiments it is less sensitive to rainfall forecast inaccuracies than prior art systems. This is because the prediction horizon needed for assets is confined to the individual travel time of wastewater between assets, which is accounted for in ABRTC via time-shift transformations. As a result, there are different prediction horizons for different assets. Moreover, the prediction horizons are as long as necessarily needed. In some cases, this means that prediction horizon may be confined to flows encountered inside of the sewer system and can be accurately measured (as opposed to rainfall prediction). Thus, for example, certain embodiments, allow for the assignment of a prediction horizon per affected asset (as opposed to a prediction horizon for the entire system). This is an advantage, since the global prediction horizon of the prior art is typically as long as the maximum prediction horizon for each asset. In the present invention, because prediction horizons (i.e. forecasts) are circumscribed to individual assets, we can use shorter prediction horizons on most assets that the used in the global prediction horizon thus reducing sensitivity to forecasts.

In the present invention, prediction horizons can short enough to not require rainfall forecast. Instead, measuring water flow upstream of the asset may be sufficient.

Yet another advantage of the present invention is that the ABRTC algorithm embedded in the agents incorporate knowledge of the system and the desired objectives of the control system. The algorithms may, for example, use supply curves that are optimized prior to implementation through search algorithms such as genetic algorithms, maximum descent optimization, and bacterial foraging algorithms. The resulting ABRTC algorithm optimality stems from the feedback used by the system as each agent determines its own cost scheme based on measured parameters. Furthermore, the complexity of the algorithm is greatly reduced and each agent has a relatively simple algorithm to execute.

Another advantage of certain embodiments is a resilience to component failure. Thus, if one agent ceases to work properly due to hardware malfunction, the other agents can automatically attempt to compensate for the deficiency due to the inherent decentralized nature of the ABRTC algorithm. The resulting behavior of the system will be suboptimal but will continue to be functional.

These features together with the various ancillary provisions and features which will become apparent to those skilled in the art from the following detailed description, are attained by the method and systems of the present invention, preferred embodiments thereof being shown with reference to the accompanying drawings, by way of example only, wherein:

Figure 1A:
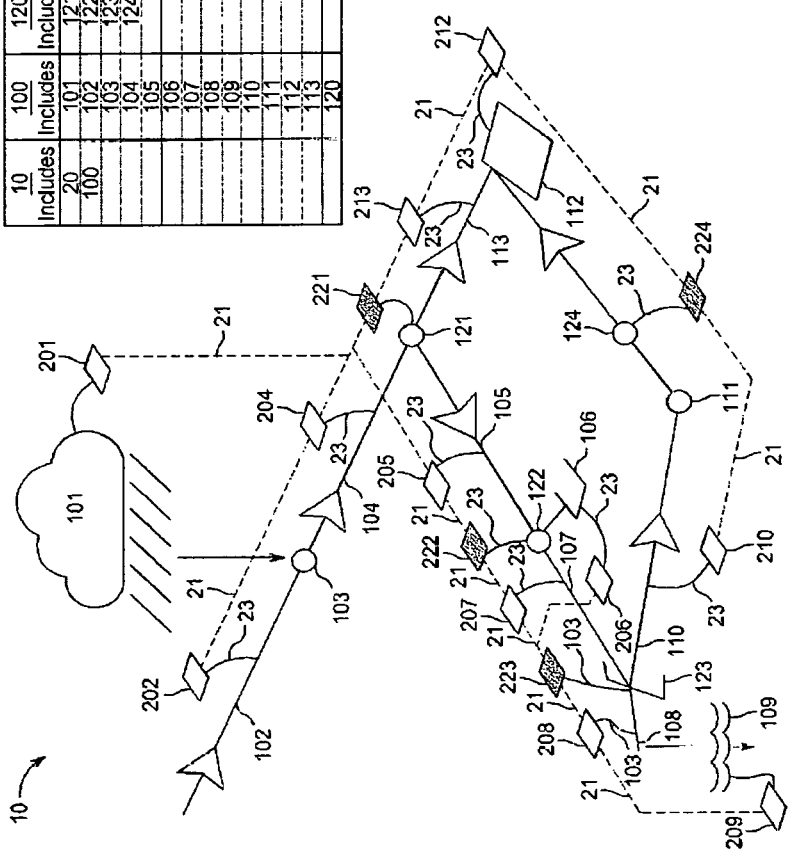
FIG. 1A is a schematic of a sewer system implementing one embodiment of a control system of the present invention.

Reference symbols are used in the Figures to indicate certain components, aspects or features shown therein, with reference symbols common to more than one Figure indicating like components, aspects or features shown therein.

DETAILED DESCRIPTION OF THE INVENTION

The mechanisms under which wet weather events affect sewer systems are called Infiltration and Inflow (or I/I). When sewer systems cannot handle wet weather events, some sewer systems will discharge untreated wastewater into rivers or the ocean in a Combined Sewer Overflow (CSO) or a Sanitary Sewer Overflow (SSO). A CSO typically results when wastewater flow is in excess of downstream wastewater treatment facility capacity. A SSO typically results from of sewer line blockage, excessive rainfall, malfunctioning wastewater pumping equipment, or broken sewer lines. The United States Environmental Protection Agency (USEPA) estimates that 850 Billion gallons of CSO and up to 10 Billion gallons of SSO are discharged each year to water bodies. See, for example, http://water.epa.gov/polwaste/npdes/cso/. The Clean Water Act of 1972 has prompted wastewater utilities to reduce or eliminate CSO and SSO discharges.

Typical solutions to minimize or eliminate CSO or SSO discharges include the construction of relief sewers, storage tunnels, and retention tanks. The costs associated with such capital infrastructure projects are significant. Thus, for example, Chicago's Tunnel and Reservoir Project (TARP) includes approximately 130 miles of 30 feet diameter tunnels bored up to 350 feet below ground, and has an estimated cost of 3.6 billion dollars. As a result, cost effective and innovative solutions have been sought.

The design of better sewer systems is exasperated by the significant temporal and spatial variability of precipitation, combined and the diverse land uses and associated concentration and travel times. As a result, not all structures that form a sewer system operate under stress at the same time. Peak flows may occur at different times in different parts of the system depending on the location and intensity of the storm event as well as the characteristics of the drainage basin. As a result, static controls, which are governed by gravity, are unable to optimize sewer storage and conveyance by balancing loads globally across the entire system. Dynamic controls, such as pump stations, which are controlled based on local conditions, are incapable of taking advantage of temporally underutilized sewer assets.

One solution to the above problems is the use of "Real Time Control," which refers to systems that dynamically control flow throughout the sewer system to achieve a certain outcome, such as minimizing overflows. The first documented Real Time Control system in the United States was in Seattle, where a computer system was used to actively control CSO discharges. Since then, significant efforts have been put forth to advance the technology which has incorporated rainfall prediction and sophisticated hydraulic and hydrologic models. The main advantage of Real Time Control systems is the reduction or elimination of overflow events at a fraction of the cost of traditional capital-intensive solutions such as storage tunnels.

Real Time Control has several limitations preventing their widespread adoption. The chief limitation is that current technologies used in Real Time Control are difficult to understand and analyze. One method of Real Time Control utilizes rain forecast and models to explore the outcomes of a massive amount of control solutions to determine the optimal control solution, such solution is arrived to through trial and error of a black box search engine and therefore it is difficult to rationalize the results. Yet another method of Real Time Control utilizes a simplified and/or linearized model to apply well-known linear or nonlinear programming techniques to find the optimal solution. In this case the model is simplifies to a degree that may bear little resemblance to the actual system and therefore the solution is not well understood.

Another problem with Real Time Control methodologies is that the optimality of the solution depends heavily on the accuracy of the rainfall prediction and the hydraulic and hydrological model. It is known to those skilled in the art that both rainfall prediction and hydraulic and hydrologic models exhibit large inaccuracies and therefore the performance of the Real Time Control could be greatly degraded.

Yet another problem with Real Time Control methodologies is that they are centrally controlled depending heavily on a robust communication system to a central controller with significant computational power. Also, component failure has to be accounted for with heuristic rules which require complete exploration of the failure possibility space.

It is one aspect to provide a control system to control the flow through a sewer system, where the sewer system includes a plurality of connected sewer assets. The control system includes: a first supplying agent associated with a first supplying asset of the plurality of sewer assets, where the first agent includes an electronic device that assigns a first virtual cost to any flow incoming to the first sewer asset, where the first virtual cost is based on a state of the first supplying agent; a second supplying agent associated with a second supplying asset of the plurality of sewer assets, where the second agent includes an electronic device that assigns a second virtual cost to any flow incoming to the second supplying asset, where the second virtual cost is based on a state of the second supplying asset; a control agent associated with a control asset, where the control asset includes an electronic device that is adapted to direct the flow from the control asset to the first supplying asset and/or the second supplying asset; and a computer network to accept the first virtual cost from the first agent and the second virtual cost from the second agent and to provide the first virtual cost and the second virtual cost to the control agent. The control agent directs flow from the control asset to the first supplying asset and the second supplying asset by minimizing a cost based on the first virtual cost and the second virtual cost.

It is another aspect to provide a method for controlling the flow through a sewer system, where the sewer system includes a control asset that provides flow a first supplying asset and a second supplying asset, where the control asset has an associated control asset, where the first supplying asset has an associated first supplying agent, and where the second supplying asset has an associated second supplying agent, where the control agent, the first supplying agent, and the second supplying agent are electronic devices in communication over a network. The method includes: in the first supplying agent, determining a first state the first supplying asset; calculating a first virtual cost of the first supplying asset from the determined first state; and providing the first virtual cost to the control agent over the network; in the second supplying agent, determining a second state the second supplying asset; calculating a second virtual cost of the second supplying asset using the determined second state; and providing the second virtual cost to the control agent over the network; and in the control agent, determining a control action of the control asset based on the first virtual cost and the second virtual cost received over the network; and actuating the control asset to direct a flow to the first supplying asset and/or the second supplying asset.

Various embodiments are discussed which include a control system for directing wastewater through a sewer system. The sewer system includes various "sewer assets" through which the wastewater flows. Sewer assets may, for example and without limitation, but are not limited to, wastewater treatment plants, sewer pipes, manholes, tanks, pump stations, gates, inflatable dams, movable weirs, valves, rain gutters, soil, vegetation, and impervious surfaces on the drainage basin. Other elements which can be considered as sewer assets are local weather, regional weather, national weather, and receiving wastewater bodies such as rivers, lakes, and oceans.

A "supplying asset" is a sewer asset that stores, conveys, or treats water from another sewer asset called the "demanding asset". For instance, a supplying asset such as a trunk line conveys water from a demanding asset such as a factory, a neighborhood, or a smaller trunk line. In a different example, a supplying agent such as a treatment plant treats water from a demanding asset such as a trunk line. Typically a supplying asset is downstream from a demanding asset. Note that based on the last two examples a trunk line can be both a demanding asset and a supplying asset.

A "control asset" is a demanding asset that can dynamically utilize more than one supplying assets. For example, a control asset such as a gate can control how incoming water flows are split between two supplying assets such as a treatment plant and a tank. In a different example, a controlling asset such as a pump can control how incoming water flows are split between two supplying assets such as the pump wet well storage and a trunk line. The control asset may be a valve, a gate, a pump, a movable weir, etc. The sewer system also includes a control system which includes, but is not limited to electronic devices ("agents") which are associated with various sewer assets.

In one embodiment, the ABRTC includes at least three agents: one control asset governed by a control agent and two supplying agents downstream of the control agent. The ABRTC system operates, for example and without limitation, by receiving a state from a monitor on an asset, and with each supplying agent setting a virtual cost based on the asset's monitored state. Each supplying agent calculates its virtual cost based on its supply curve and its current state. Then each supplying agent communicates (via a data network) to the control agent its own virtual cost. The control agent determines the appropriate control action such that it minimizes its cost by sending more flow to the supplying asset with the lower virtual cost. This process is repeated at each time step.

In another embodiment, the supply curves are determined such that a desirable objective is achieved, including but not limited to: reducing the volume of combined sewer overflows; reducing the number of combined sewer overflow events; reducing the volume of flooding occurring during a storm event; improving the water quality of the receiving stream; and/or maximizing the storage and/or conveyance of the sewer system. In certain embodiments, the supply curves are determined offline using search algorithms such as genetic algorithms, bacterial foraging optimization, etc. Virtual costs may also be determined by one or a combination of the following hydraulic states, including but not limited to: current or predicted hydraulic capacity, flow, level, volume of the asset, resident time of the water in the asset, humidity, conveyance capacity, or storage capacity; and/or water quality states, including but not limited to: the current or predicted water quality of the water in the asset. Devices and techniques for measuring such states are well known in the field.

FIG. 1A is a schematic of one embodiment of a sewer system 10 including sewer assets 100 such as local weather 101, sewer pipes 102, 104, 105, 107, 108, 110, and 113 valves 103 and 111, a tank 106, a river 109, and a wastewater treatment plant 112. Sewer assets 100 also include one or more controllable assets 120, which in FIG. 1A includes valves 121, 122, a movable weir 123, and a pump station 124.

Sewer system 10 also includes control system 20, which further includes agents 200 and control agents 220. Agents 200 include agents 202, 204, 205, 207, 208, 210 and 213 corresponding, respectively to sewer pipes 102, 104, 105, 107, 108, 110, and 113; agent 201 corresponding to local weather 101; agent 209 corresponding to river 109; and agent 212 corresponding to wastewater treatment plant 112. Control agents 220 include: controlling agents 221 and 222, corresponding respectively to valves 121,122; control agent 223 corresponding to movable weir 123; and control agent 224 corresponding to pump station 124. Agents 200 and control agents 220 can be in wired or wireless connection 23 to corresponding asset 100 or control asset 120, and be part of a network of other agents or control agents via network connections 21.

Figure 1B:
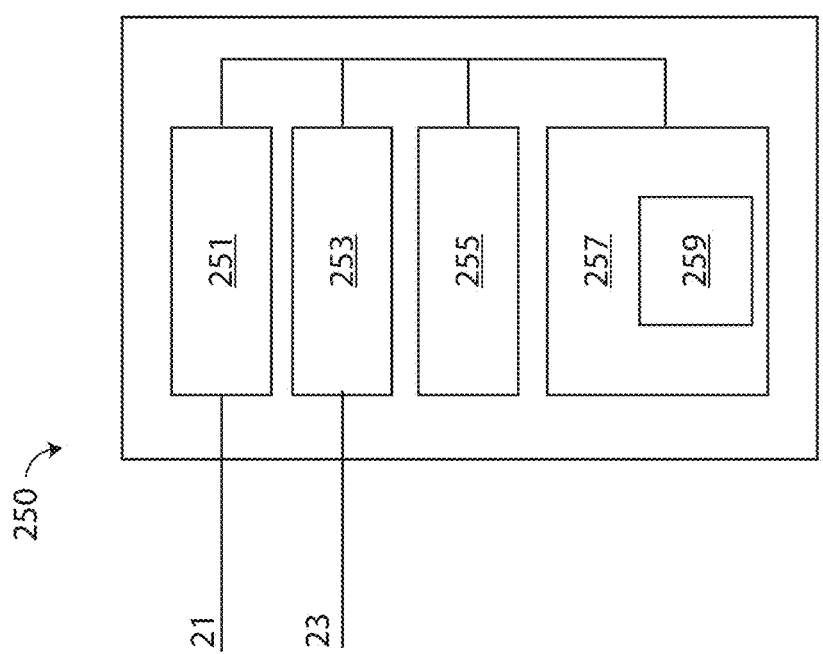
FIG. 1B is a schematic of an agent.

In sewer system 10, flow entering through sewer pipe 102 and from local weather 101 flows through sewer pipe 104 and, depending on a control setting of valve 121, through sewer pipe 113 to wastewater treatment plant 112, or through sewer pipe 105. The flow through sewer pipe 105 can be directed to tank 106 or to sewer pipe 107, depending on a control setting of valve 122. The flow through sewer pipe 107 can flow over weir 123 into river 109 or, depending on a control setting of the weir, to sewer pipe 110, and then through control pump 124 to wastewater treatment plant 112. As described subsequently, agents 200 and 220 determine virtual costs of their corresponding assets 100/120, FIG. 1B is a schematic of an agent 250, which can be configured to be one of agents 200 or control agents 220. In one embodiment, agents 200 and control agents 220 are electronic devices which, but are not limited to, field-ruggedized computing hardware such as Programmable Logic Controllers (PLC) or embedded PCs. Optionally, a server (not shown) may be provided in control system 20 for the storage of information or to provide overall visualization of the system.

As shown in FIG. 1B, agent 250 includes wireless communication hardware 251, wired communication hardware 253, a processor 255, and digital memory 257 which includes programming memory 259. Memory 269 includes programming for processor 255 that allows agent to communicate via wireless communication hardware 251 to other agents and for wired communication hardware 253 to receive signals, such as measurements from an asset, and, in the case of a control agent, provide signals to a control asset. Memory 269 also includes programming for an ABRTC algorithm which can allows each agent 250 received and/or transmitted information with other agents 200/220, and to control the control assets 220.

In certain embodiments, the ABRTC algorithm of each agent 200 and control agent 220 is capable of determining or computing the current and/or forecasted state of its corresponding asset 100 or control asset 120, including but is not limited to predicting or measurements (from measuring equipment on the asset) one or more of: 1) wastewater level, flow, volume, and quality; 2) current and forecasted precipitation, relative humidity, and temperature (in the case of weather); 3) operational state (in the case of treatment plants or pumps); and/or 4) soil moisture (in the case of soil in drainage basin). Thus, each agent 200 and control agent 220 may, for example and without limitation include digital and/or analog hardware for any combination of: 1) receiving information from a corresponding sewer asset 100 or control asset 110 (for example, a wastewater storage tank upstream of a treatment plant, the supply agent associated with the plant could measure plant capacity and provide virtual cost to the demanding agent associated with the tank; in another example, a control agent associated with a CSO outfall diversion gate may include input of virtual costs from a supplying agent measuring level in an interceptor downstream); 2) receiving and/or transmitting information to other agents and/or control agents; 3) sending control signals to control assets such as pump stations, gates, inflatable dams, movable weir, and valves (for a control asset, such as a CSO diversion gate, the asset control agent may include inputs of virtual costs from agents measuring levels at the interceptor and an output to control such gate position; or 4) performing calculations on information from one or more assets which, without limitation, may include algorithms described herein.

Agents 200 and controlling agents 220 exchange information with other agents over network connections 21 which are the result of calculations based on the state of the sewer. As an example of networking protocols, Supervisory Control and Data Acquisition (SCADA) systems provide network connectivity for agents to communicate with each other. SCADA systems have the advantage of being broadly used by wastewater utilities. In another example, peer-to-peer wireless networks are used to allow agent to communicate with each other. Peer-to-peer wireless networks have the advantage of being resilient to component failure as each agent is able to communicate with its neighbors.

Each agent 200 includes computing hardware that is assigned to, and which obtains measurements from or calculates values related to, a corresponding asset 100. Each control agent 220 includes computing and communication hardware that is assigned to, and provides signals to the assigned control asset 120 to affect wastewater flow in sewer system 10. One or more control agent 220 may optionally obtain measurements from its control asset. Agents 200 and control agents 220 also each include communication hardware including communication by a wired or wireless connection 23 to a corresponding asset 100 or control asset 120, and to communicate by network connections 21, to one or more other agents 220/230 to form a network. Further, control agents 220 are also capable to sending signals to their corresponding control asset 120 to control the operation of that asset, such as, for example, and without limitation, by operating a valve or pump.

More specifically, each agent 200 and control agent 220 includes programming specific to a corresponding asset 100 or control asset 120 as part of an ABRTC algorithm. Agents 200 and control agents 220, which are networked, exchange computed information, and the ABRTC algorithm of each control agent 220 can, based on the exchanged information, control the operation of a corresponding control asset 120 to control the flow of wastewater through sewer system 10.

The ABRTC algorithm of each agent 200 or control agent 220 includes, or may include, accepting perform calculations and implement an ABRTC algorithm, described subsequently, for the control agent's corresponding control asset. Thus, for example, the control agent for a control valve may send the valve position signals to operate the valve, the control agent for a control pump may send the pump velocity signals to operate the pump, the controlling agent for a controllable weir may send the weir position signals to operate the weir, etc. The programmed ABRTC algorithm of control agents 220 affect control assets (e.g. by redirecting flows) to minimize the cost of using the affected supplying assets on sewer system 10.

In certain embodiments, the ABRTC algorithm of each supplying agent 200 assigns a virtual cost for any incoming flows that may change the supplying asset current or forecasted state based on a predefined function, or "supply curve." The supply curve has as input the current or forecasted state of asset and as output a unit virtual cost per unit of volume (e.g. per gallon) or per unit of flow (e.g. per gallons per minute).

In one embodiment, the ABRTC algorithm emulates a free market economy where the operation of sewer system 10 is determined by the equilibrium of a supply and demand relationship determined by agents 200 and 220. Thus, for example, assets 100 and control assets 120 comprise a wastewater network. Each asset 100 (as a supplying asset) has an inflow of water from the nearest upstream asset 100 or 130 (as a demanding asset). Similarly, each asset 100 (as a demanding asset) has an outflow to the nearest downstream asset 100 or 120 (as a supplying asset). Each control asset 120 has an inflow of water from the nearest upstream demanding asset 100 or 120, and is controllable to provide an outflow to one or more nearest downstream supplying asset 100 or 120. The flow through each asset 100 or 120 has a "cost" associated with the flow as computed by the asset's corresponding agent. Thus, for example, each agent, as a supplying agent, sets a price based on its current state and its supply curve. The supplying agent's current state is affected by demanding agents whose output is provided as input to the supplying agent. A demanding agent is a control agent if it can choose to send flow between more than one supplying agents. A demanding agent that is a control agent decides which supplying agent to use in order to minimize costs. In a sewer system, the service provided is to transport water away from the demanding consumer (similarly to a solid waste collection company). Assets upstream are generally demanding assets, while elements downstream are supplying assets. Obviously, an asset can be both a supplying asset to an upstream asset and a demanding asset to an asset downstream at the same time. The supply curve can be based on a variety of factors depending on the application.

Figures 2, 3:
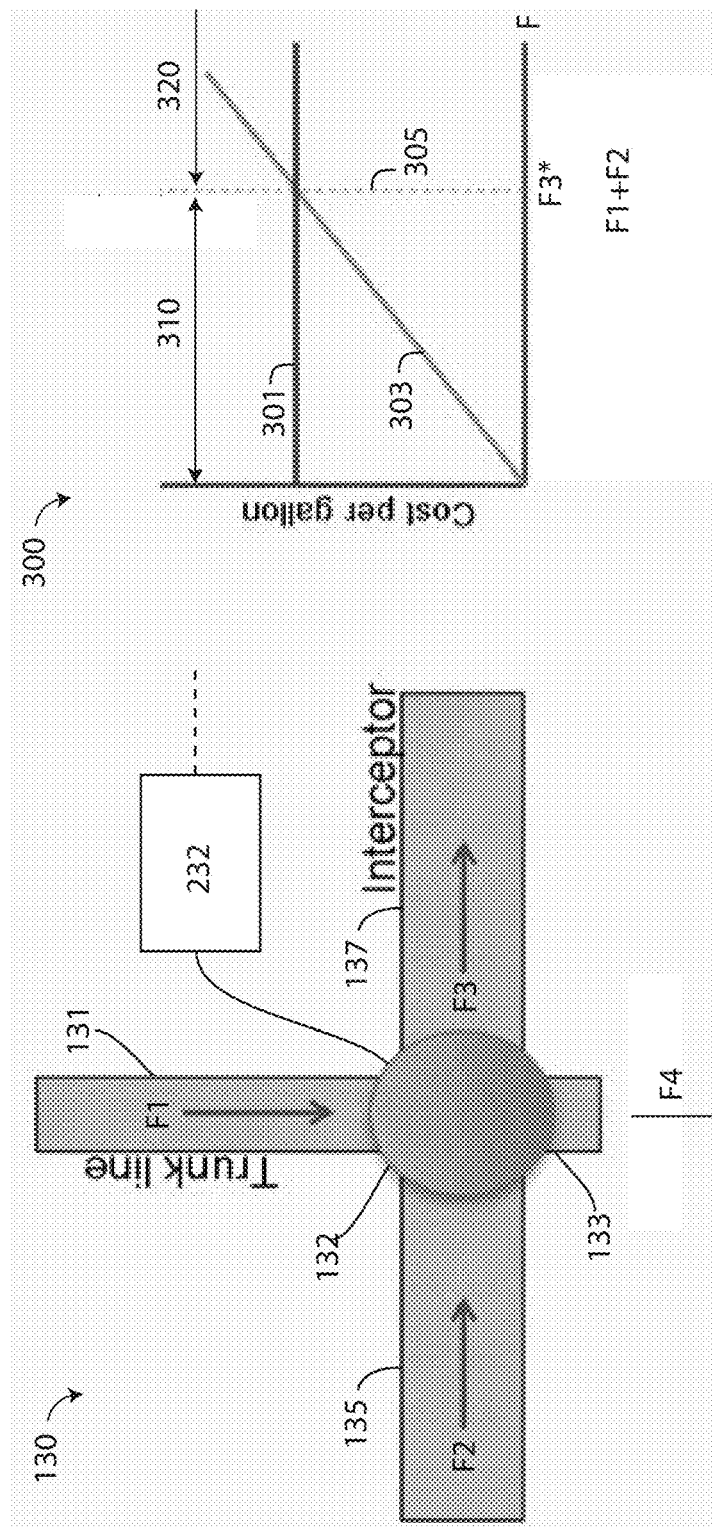
FIG. 2 is a schematic of a CSO diversion structure
FIG. 3 is an example of a supply curve for used in an ABRTC system

As an example of one control agent and asset and two downstream supplying agents, FIG. 2 is a schematic of a CSO diversion structure 130 that includes a valve 132, which is a control asset and a corresponding control agent 232. CSO diversion structure 130 accepts water flow F1 from a trunk line (interceptor) 131 and, depending on the setting of valve 132, can divert water to a water flow F3 to an interceptor 137 (a first supplying asset which has a maximum capacity F3=F3*) and/or to a water flow F4 to a CSO outfall 133 (a second supplying agent).

The supply curves for the CSO outfall supplying agent and the downstream interceptor supplying agent are illustrated in FIG. 3 as supply curves 300. The supply curve for the downstream interceptor line is represented by 303. The supply curve for the CSO outfall is represented by 301. The supply curve for the downstream interceptor determines the virtual cost per gallon of flow diverted to it by the control agent based on the downstream total flow F3. The virtual cost per gallon for the downstream interceptor increases as the capacity of the downstream interceptor gets depleted. The supply curve for the CSO outfall maintains a cost per gallon of flow diverted to it that is constant and independent of its conveyed flow indicating that overflows are penalized by event and not volume.

The supplying agent associated with the downstream interceptor line measures the total flow F3 and uses its supply curve to determine its virtual cost. The supplying agent associated with the CSO outfall does not require measurements to determine its virtual cost as it is constant. Each supplying agent transmits its virtual cost to the control agent (the CSO diversion control valve). Typically, during dry weather, the capacity of downstream interceptor 137 is less than the interceptor maximum capacity. Based on the way that the supply curves are designed virtual cost for the downstream interceptor is less than the virtual cost of the CSO structure. The control agent then commands the valve 132 to direct flow F1 to interceptor 137. The flow in the interceptor 137 downstream of the regulator is F3=F1+F2, and no water to CSO outfall 133 (F4=0). During wet weather, as the combined flows F1 and F2 approach the maximum capacity of interceptor 137 the virtual cost of the downstream interceptor will increase. Eventually, the combined flows F1 and F2 will exceed the maximum capacity of the downstream interceptor (that is, F1+F2>F3*). At this point the control agent will start diverting flows to the CSO outfall F4 to prevent the virtual cost of the downstream interceptor to exceed the virtual cost of the CSO outfall. That is, the control valve will divert a portion of F1 towards the downstream interceptor effectively keeping F3=F3*. The excess flow F4=F1+F2−F3* is sent to the CSO outfall. This action by the control agent, by virtue of the supply curves design, prevents the downstream interceptor line from exceeding its maximum capacity. It is possible under extreme weather conditions that the upstream interceptor flow F2 is greater than the design maximum downstream interceptor capacity F3*. In such case, the virtual cost sent to the control agent by the downstream interceptor line will exceed the virtual cost sent by the CSO outfall to the control agent. This will prompt the valve to divert all of its flow F1 towards the CSO outfall, making F4=F1.

EXAMPLES OF SUPPLY CURVES FOR SUPPLYING AGENTS

An example of a supplying asset is a tank. A tank is a sewer asset that is capable of storing water, up to some tank capacity, for a finite amount of time. In the embodiment of FIG. 1A, for example, tank 106 has an ABRTC algorithm provided to the programming of agent 206. The ABRTC algorithm in agent 206 includes a supply curve such that cost increases with the amount of water stored in the tank. Because tanks should not store wastewater for extended periods of time, and because they should be prepared for the next storm event, the cost should also increase with the amount of time the water is stored in the tank (similar to interests charged for debt). Thus, for example the cost curve for tank 106 may take the form of $\alpha L+\beta t$ where a is a positive constant, L is the level in the tank, $\beta$ is another positive constant, and t is the time that the tank has been holding water (L>0).

The ABRTC algorithm of a sewer asset such as a tank may, in certain embodiments, change the shape or function of the supply curve of that asset as a function of forecasted precipitation. For example, if forecasted precipitation is large and short in duration, the cost for storing water per unit of time can increase to force the tank to dewater faster. The economical equivalent is called commodities speculation. In one embodiment, the ABRTC algorithm in agent 206 of tank 106 accepts, over control system 20, a virtual cost from agent 211 monitoring the local weather 111. Thus, for example, agent 211 determines the total precipitation forecast over a certain period of time. Agent 211 has its own supply curve and uses the forecast to calculate a virtual cost. The supply curve of agent 211 may have the form of $P=\theta p$ where P is the virtual cost of agent 211, $\theta$ is a positive constant and p is the total precipitation forecast over a certain period of time in the future. The virtual cost of agent 211 P is transmitted to agent 206. In that case the supply curve for agent 206 could take the form of $\alpha L+\beta t+P$.

Another example of a supplying agent is an outfall that diverts water to receiving body of water, such as outfall line 108 of FIG. 1A or CSO outfall 133 of FIG. 2. The supply curve programmed into the agent of these assets can, in certain embodiments, have a constant cost K if the number of discharge occurrences is more important than the volume of wastewater discharged. The outfall virtual cost may also, in certain embodiments, vary with the water quality of the receiving water body. In such case the supply curve of the outfall could take the form of K+Q where Q is the virtual cost of the receiving water body's agent 209

Effect of Travel Time on Agent Behavior

For sufficiently small sewer systems, the travel time required for water to flow between assets need not be taken into account to adequately control the system using the ABRTC system described above. Thus, for example, if the ABRTC system sends signals from a control agent to a control asset every five minutes, and the travel time for water to flow from one asset to the next is less than five minutes, the ABRTC system described above can adequately control the sewer system. If, however, the time required for water to flow between two assets is too large, the travel time should be accounted for to provide better control of the sewer system. Thus, for example, if there control valve at an input of a long sewer line, it may be advantageous for the ABRTC system to account for the time delay. The following is a discussion of one embodiment of an ABRTC system that is adapted to include the effect of travel time, which is referred to herein, and without limitation as Predictive ABRTC.

Figure 4:
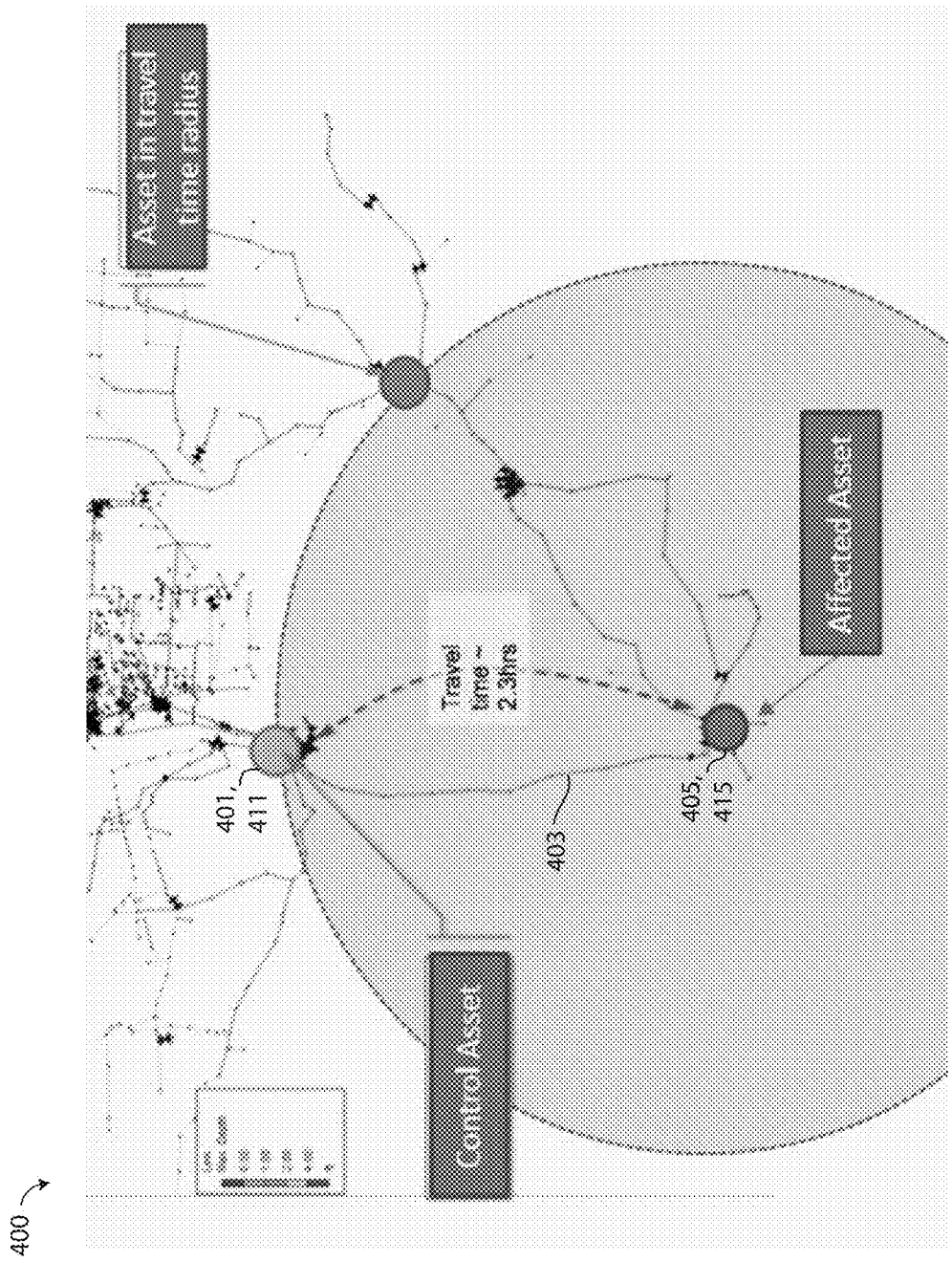
FIG. 4 is embodiment of a sewer system illustrating the travel time radius.

By way of example, FIG. 4 illustrates an embodiment of a sewer system 400 where several hours are required for wastewater to traverse a sewer line of several miles of length. Sewer system 400 includes a control asset as a gate 401, a sewer line 403, and a treatment facility 405. Sewer system 400 also includes a control system, generally similar to control system 20 but which includes Predictive ABRTC, and where a control agent 411 corresponds to gate 401 and a supplying agent 415 corresponds to treatment facility 405. As indicated in FIG. 4, sewer line 403 long, taking 2.3 hours for water to flow from gate 401 to treatment facility 415. Consider, for example, when gate 401 is operated from being closed to being open. Water flow through sewer line 403 at treatment facility 405 will be low or zero for the next 2.3 hours, at which time it will rapidly increase to some maximum flow rate. If water is reaching treatment facility 405 by other sewer lines, the treatment facility 405 may suddenly reach its capacity, and the excess water may result in in flooding or an overflow when that water reaches the treatment facility.

Such problems can be reduced or avoided by compensating for the flow travel time in control system 20. In one embodiment, this can be accomplished by including forecasting as a Predictive ABRTC algorithm into control agent 411. Thus, for example, the delay caused by sewer line 403 may, in certain embodiments, be compensated for by including a 2.3 hour forecast of the behavior of the supplying agent 415. One such compensation, referred to herein as a "time-shift transformation," allows control agents to make decisions based on the predicted cost of the supplying agents.

In certain embodiments, each control asset having at least one of the supplying assets with a significant travel time includes forecast of the future state. Thus, for example and without limitation, time-shift transformations are performed for each individual control asset with a long travel times to at least one supplying asset. Thus, a sewer system may require more than one time-shift transformation. The aggregation of several time shift transformations is taken into account inherently by the agent-based real time control system as the system is decentralized in nature and each agent makes its own decisions such control agent requires a time-shift transformation.

In one embodiment of the time-shift transformation, a travel time radius is first determined. The travel time radius is the collection of all sewer assets upstream of the furthest away supplying asset that have the same travel time between the control asset and such furthest away supplying asset. The travel time radius assets are used to predict the future state of the supplying asset. The future state of the supplying asset is used by the control asset to make present decisions. Often travel time radius assets are in the sewer system. In other circumstances, the asset in the travel time radius may be outside the sewer system. For example, the travel time radius may include the weather system or forecast. As such, current rain intensity or even rainfall forecast may be in the travel time radius.

The time-shift transformation only affects the control agent that is trying to make a decision which will have a delayed effect on at least one of the supplying agents. In particular, the Predictive ABRTC algorithm in the control agent must be able to predict the supplying asset's virtual cost changes to the control agent's actions. To do this a Predictive ABRTC algorithm is implemented as follows: 1) a hydraulic model representing the sewer system as built is developed. Such models are well known in the field, and include sufficient physical detail to simulate the flow rates through the various assets, including the flow rate at each time in the sewer system. Of particular interest here is that length, diameter, and slope of long sewer lines having a long time travel. 2) The hydraulic model is changed by a time-shift transformation to a "time-shift model" where the supply assets have the same dynamic reaction to the control agent actions as in the hydraulic model but such reaction will be with negligible delay (for example less than 15 minutes) to the control agent actions. 3) Using the "time-shift model" the supply curves for the supplying agents are designed, tuned, and optimized. 4) The control agents are then provided with Predictive ABRTC control by including the supply curves determined in the previous step and a forecasted virtual cost from the "time-shift model," which is essentially forecasting the hydraulic state of the supplying agents and using the supply curves to determine the forecasted virtual cost. In one embodiment, the forecasted virtual cost is based on a hydraulic model of the supply asset that forecasts the supply asset flow as a function of time in response to the control of the control asset.

Example 1

Figure 5:
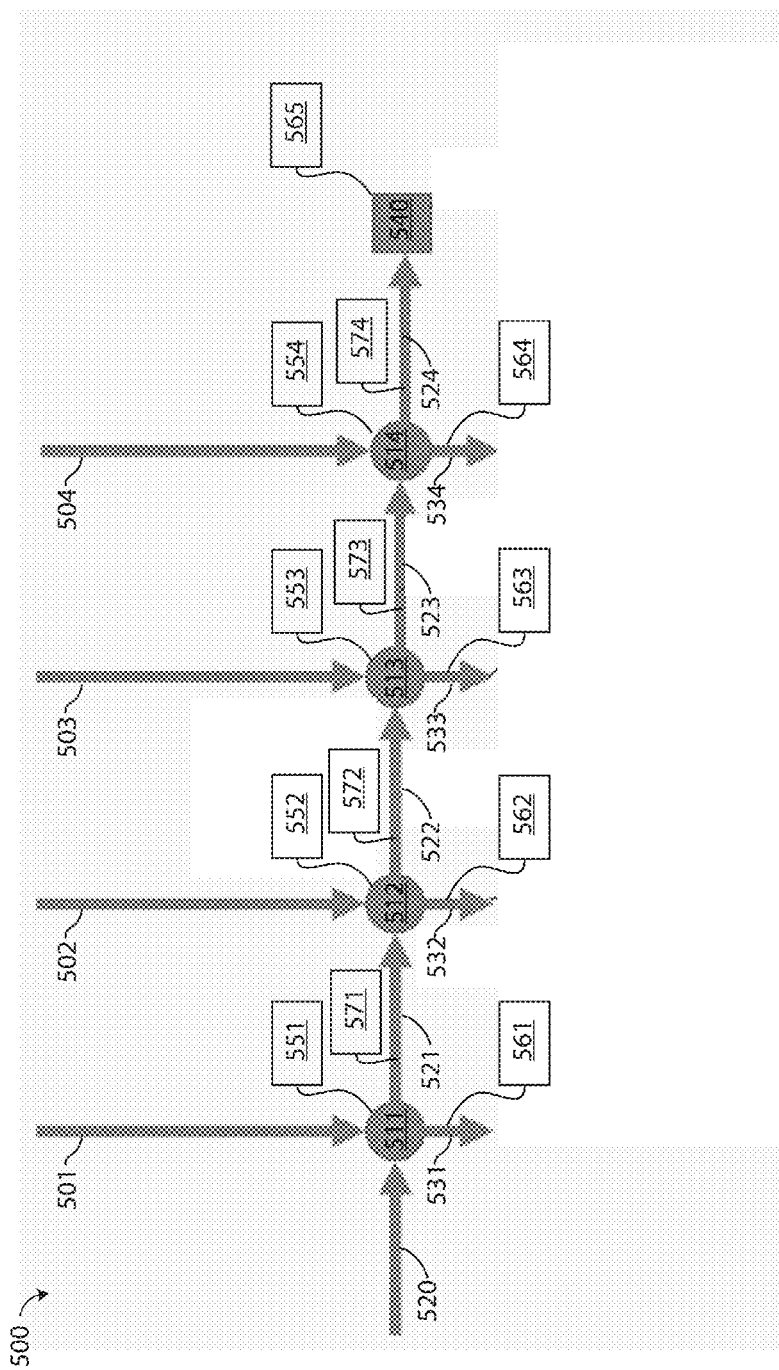
FIG. 5 is an illustration of a portion of a sewer system that includes several trunk lines each ending in a corresponding controllable gate.

FIG. 5 is an illustration of a portion of a sewer system 500 that includes several trunk lines 501, 502, 503, and 504 each ending in a corresponding controllable gate 511, 512, 513, and 514. An interceptor line 520 receives flows from gates 511 and continues as interceptor 521, which receives flows from gate 512 and continues as interceptor 522, which receives flows from gate 513 and continues as interceptor 523, which receives flows from gate 514 and continues as interceptor 524, which then provides wastewater to a wastewater treatment plant 540. In addition, gates 511, 512, 513, and 514 each have a corresponding CSO outfall 531, 532, 533, and 534. Control gates 511, 512, 513, and 514 are controlled by a corresponding control agent 551, 552, 553, and 554, interceptors 521, 522, 523, and 524 have a corresponding agent 571, 572, 573 and 574, CSO outfalls 531, 532, 533, and 534 have a corresponding agent 561, 562, 563, 564, and wastewater treatment plant 540 has a corresponding agent 565. Control agents 551, 552, 553, and 554 and agents 561, 562, 563, 564, 561, 572, 573, 574, are networked together (not shown) and are generally similar to the agents described above in control system 20.

By way of explanation of the control system of sewer system 500 consider, for example control gate 512 and the corresponding control agent 552. At any moment in time, the agents corresponding to assets immediately downstream of control gate 512, which are the supplying agents 562 and 572, determine use the programmed ABRTC algorithm of each agent to calculate a virtual cost based on teach supply curve. Thus, for example, at each time iteration (which may be, for example, every 5 minutes), supplying agents 562 and 572 transmit their virtual cost to control agent 522, which uses the virtual costs do control gate 512 and thus provide water to CSO outfall 532 or interceptor 522 by minimizing the cost computed in control agent 522, as, for example as described above with reference to FIG. 3. Thus, for example, control agent 552 calculates the cost of sending water to CSO outfall 532 by multiplying the flow that goes to the CSO outfall by the virtual cost of supplying agent 532, and by calculating the cost of sending water to interceptor 522 by multiplying the flow that goes to interceptor 522 by the virtual cost of supplying agent 572. The total cost calculated by controlling agent 522 is the sum of the cost of sending water to CSO outfall 532 and the cost of sending water to interceptor 522.

Control agent 552 can minimize its cost iteratively by increasing the water flow to interceptor 522 if the cost to send water to the interceptor is lower than cost to send water to CSO outfall 532, at each time step. Conversely, control agent 552 can minimize its cost iteratively by increasing the water flow to CSO outfall 532 if the cost to send water to interceptor 522 is higher than cost to send water to the CSO outfall, at each time step. Alternatively, control agent 552 can, in one time step, determine how much water needs to be diverted to each asset such that its total cost is minimized. Notice that the virtual costs will change as a result of a change in the decision of flow allocation by control agent 522.

In one embodiment, for example, the virtual cost calculated by of supplying agent 532 is constant (as in FIG. 3), signifying that diverting water to the CSO outfall is the same per unit of flow regardless of the amount of flow diverted. In contrast, the virtual cost calculated by of supplying agent 533 is determined by the capacity of interceptor 523 to carry flow. As the capacity of the interceptor is depleted, the virtual cost increases. To determine status of the interceptor, supplying agent 572 first determines a local virtual cost based on the capacity of interceptor 522 and a local supply curve which increases as the level increases. Then, supplying agent 572 obtains, from supplying agent 573, the virtual cost of the downstream interceptor flow. The virtual cost of supplying agent 572 is, in this case, calculated as the maximum between the virtual costs of the supplying agent 532 and its own local virtual cost. This way, the calculated virtual cost determined by supplying agent 572 represents the maximum local virtual cost along all downstream supplying agents. The most downstream asset in this example is wastewater treatment plant 540, which can also be a supplier by setting its virtual cost such that it increases as the treatment plant capacity is depleted.

In this example, CSO outfalls can also be prioritized. Thus, for example, if one of the CSO outfalls is an environmentally sensitive area, then the supply curve can be selected so that that CSO outfall has the highest cost. For example, the CSO outfall with supplying agent 533 could be prioritized. In that case, the supply curve of supply agent 533 can be set higher relative that the supply curve of other CSO outfalls.

Example 2

Figure 6:
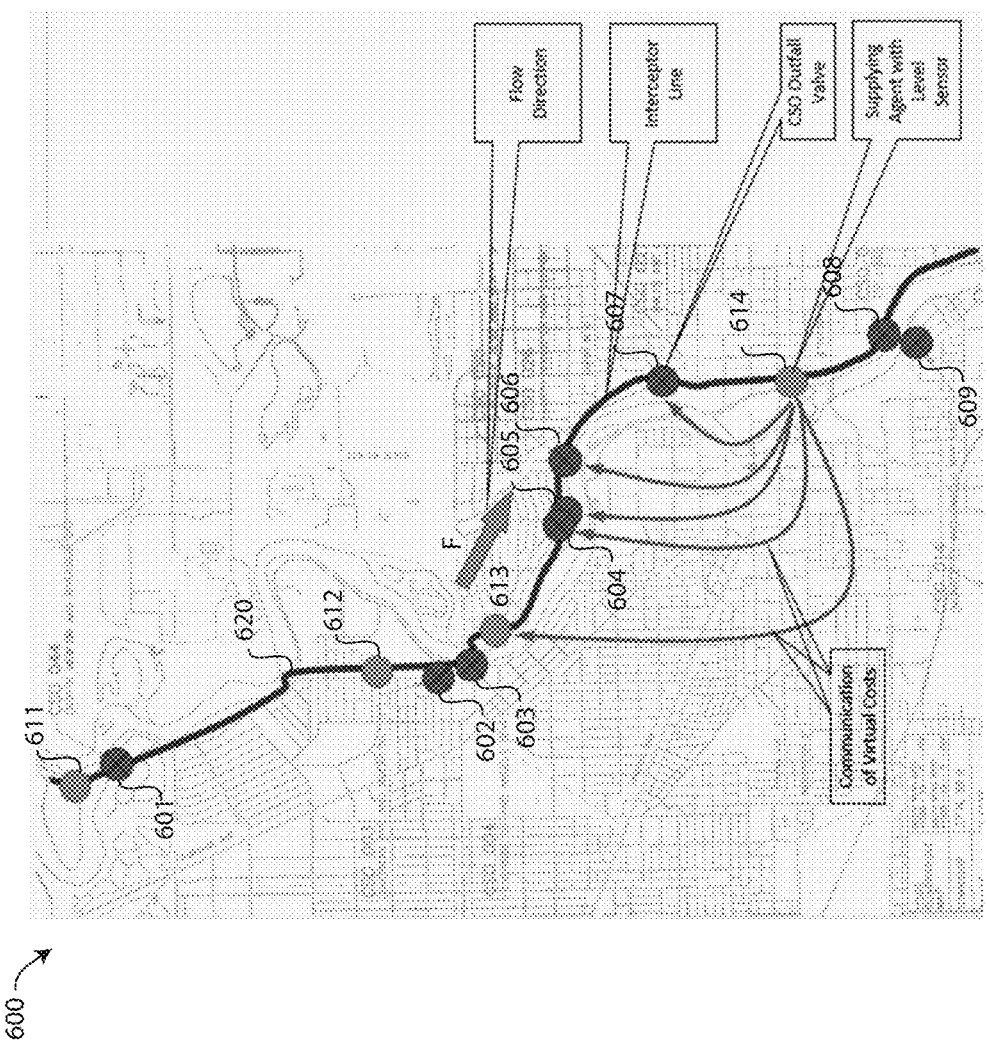
FIG. 6 is a plan of a sewer system in which the ABRTC system was implemented.

FIG. 6 is a plan of a sewer system 600 in which the ABRTC system was implemented. FIG. 6 shows control agents 601, 602, 603, 604, 605, 606, 607, 608, and 609 on an interceptor line 620 which each correspond to a CSO diversion structure (not shown) that has a CSO outfall at the noted location, and where each controlling agent is generally similar to control agents 220, FIG. 6 also shows four supplying agents 611, 612, 613, and 614, which each measure a water level in the corresponding asset. At any time, supplying agents 611, 612, and 613 determines a local virtual cost and communicates the virtual cost to all control agents upstream from it, but not upstream from another supplying agent. Each supplying agent 601, 602, and 603 also communicates the virtual cost calculated by that agent to the most immediate upstream supplying agent. Thus, for example and as show with arrows, supplying agent 614 reports a virtual cost calculated by the ABRTC algorithm of supplying agent 613 to control agents 604, 605, 606, and 607.

Each supplying agent determines its virtual cost by determining the maximum cost between its own local virtual cost and the cost of the most immediate downstream supplying agent. Each controlling agent receives the virtual cost of the supplying agent immediately downstream of itself. Then each controlling agent determines its control action to minimize its cost based on the virtual cost of the most immediately downstream supplying agent and the cost of the CSO outfall agent (implicit in this example as the virtual cost for each CSO outfall agent is fixed).

Figures 7A, 7B, 7C, 7D:
FIG. 7A is a chart showing the original system performance of the sewer system of FIG. 6.
FIG. 7B is a chart showing the system performance of the sewer system of FIG. 6 using ABRTC.
FIG. 7C is a chart showing the overflow savings for each CSO of the sewer system of FIG. 6 using ABRTC.
FIG. 7D is a table showing the performance for each year for the sewer system of FIG. 6 using ABRTC.

FIGS. 7A, 7B, 7C, and 7D show shows the results of this implementation of an ABRTC system in the sewer system of FIG. 6. FIG. 7A is a chart 701 showing the original system performance, where overflow accounted for 1187/(1187+3038)=22% of the total flow. FIG. 7B is a chart 702 showing the system performance using ABRTC where overflow accounted for 458/(458+3236)=14% of the total flow, which is a large system improvement. FIG. 7C is a chart 703 showing the overflow savings for each CSO. FIG. 7D is a table 704 showing the performance for each year which relates the total precipitation for a year and the total overflow volume for each year. In addition, there was a 70% CSO outfall reduction and a savings of $150 million using ABRTC.

Example 3

Figure 8:
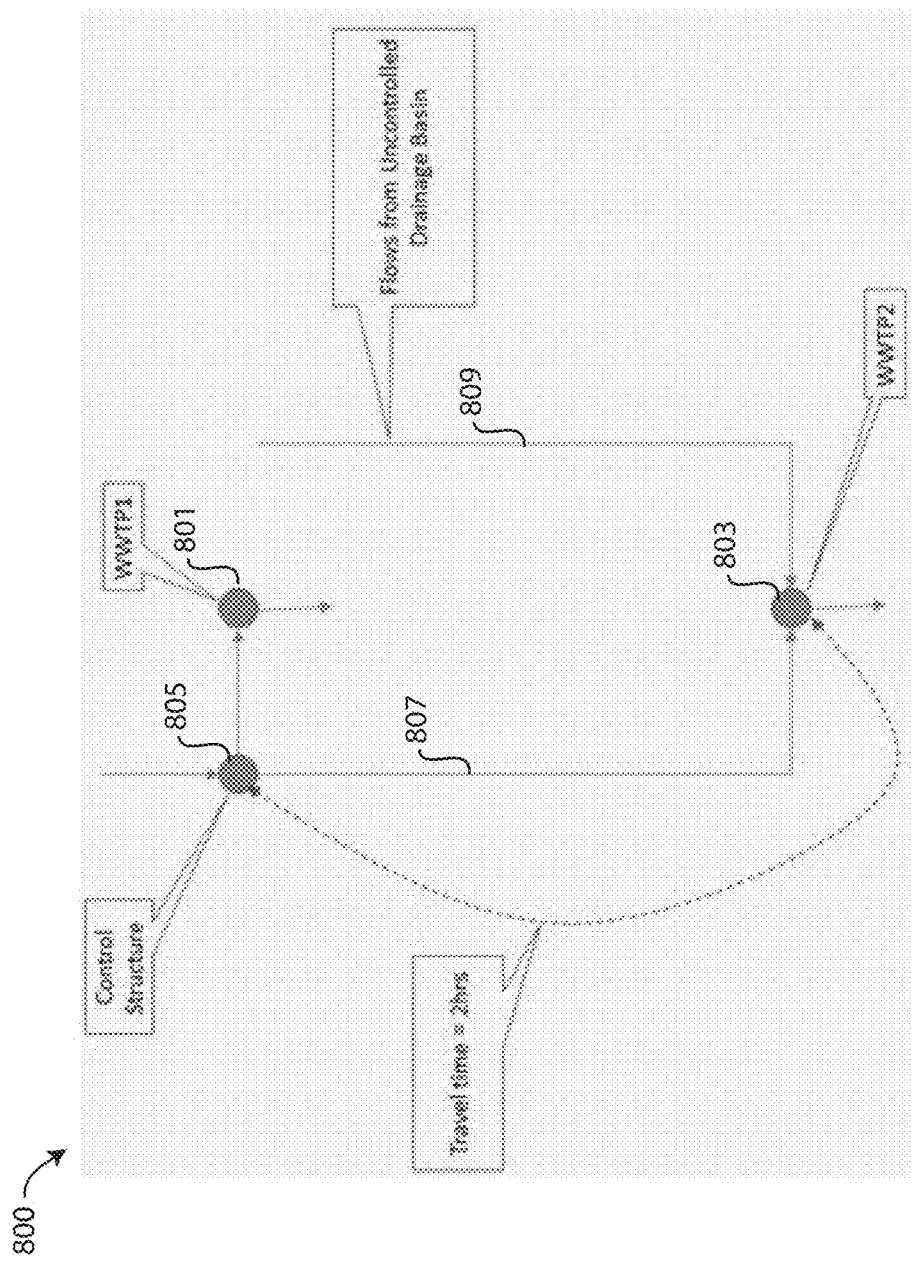
FIG. 8 is an illustration of a single sewer system that includes two wastewater treatment plants.

FIG. 8 is an illustration of a single sewer system 800 that includes two wastewater treatment plants: WWTP1 801 and WWTP2 803. A control structure 805 has the ability to divert flow from a drainage basin 809, through sewer line 807, from WWTP1 801 to WWTP2 803. WWTP1 801 is located near control structure 805, and thus there is little time delay between the actuation of the control structure and the arrival of wastewater at WWTP1. WWTP2 803 is located some distance away, and any action by the control structure 805 reaches WWTP2 2 hours later through sewer line 807. Control is aggravated by the fact that WWTP2 also receives water from uncontrolled basin 809. Without predictive information on the flows that will arrive from the uncontrolled basin, WWTP2 803 may be overwhelmed or underutilized and corrective actions would take 2 hours to take effect.

Figure 9:
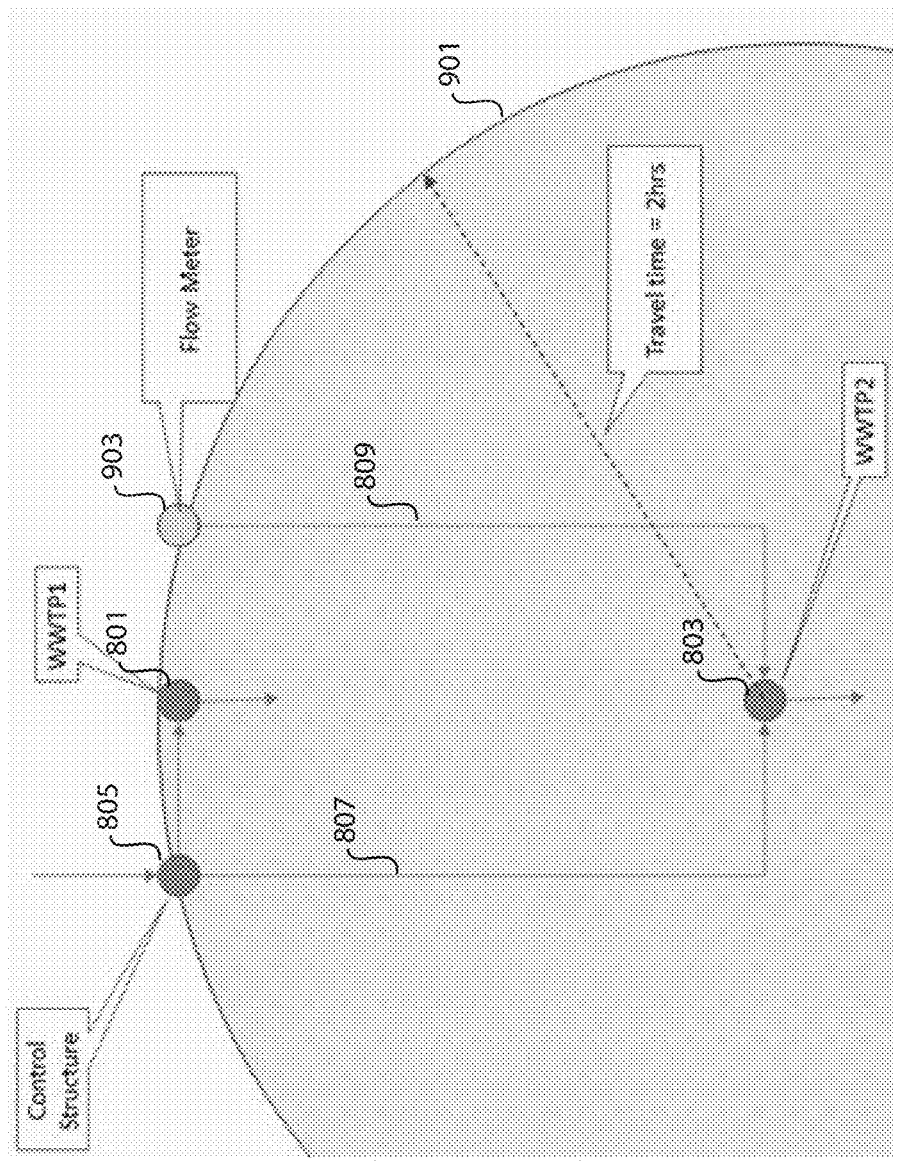
FIG. 9 illustrates a time-shift transformation.

To address the time delay, a Predictive ABRTC algorithm is developed as follows. First, a time-shift transformation is performed, as illustrated in FIG. 9. A travel time radius search is performed to determine locations that have the same delay as sewer line 807 (2 hours) from uncontrolled basin 809, as arc 901. This identifies the location where a flow meter should be installed (as flow meter 903) to provide predictive information. In other embodiments several flow meters may be needed as the pipe arriving to the WWTP2 may have tributaries joining downstream of the location of the flow meter. In this example, the data needed for the prediction horizon identified comes from a location in the sewer located at flow meter 903. In other embodiments, the prediction horizon may be large and the sewer lines may be too short to identify an in-system data source. In such cases, actual rainfall data or forecasted rainfall data may be needed.

Figure 10:
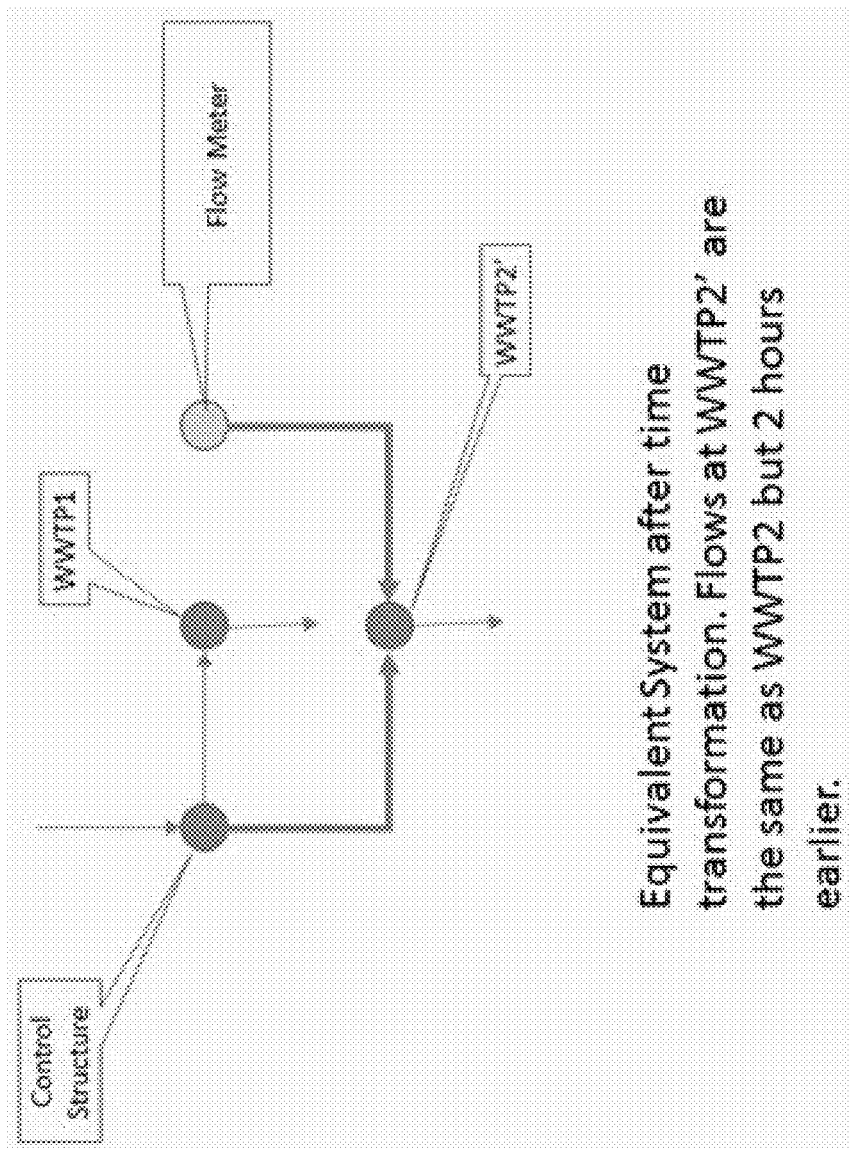
FIG. 10 illustrates the time-shift transformed system.

After suitable sensor (flow meter) locations are identified and included as sewer assets with corresponding agents, the control aspects of the time delay are incorporated into the ABRTC system. The solution of finding the optimal supply curves can be changed to one that has a negligible travel time between the control structure and WWTP2 803, as is illustrated in the time-shift model of FIG. 10, which illustrates the time-shift transformed system 1000 of sewer system 800, which includes the additional flow meter 903 and a time shifted WWTP2 1003.

To build a time-shifted model for this example, a hydraulic model of sewer system 800 is first developed, by standard modeling techniques. See, for example, USEPA's SWMM modeling package, as described at http://www.epa.gov/water-research/storm-water-management-model-swmm. Next the hydraulic model is modified. In particular, the length of the pipe connecting the control structure and the WWTP in the hydraulic model is modified by being shortened such that travel times are negligible (i.e. less than 15 minutes). Further, the length of the pipe connecting the flow meter with the WWTP in the hydraulic model is shortened to have a negligible travel time (i.e. less than 15 minutes). Changes to the shape, slope, length, and other characteristics of the shortened pipes are also included to mimic the dynamics of the original model but with a shortened travel time. Typically, such changes concentrate on the storage component of the connecting pipe, and other changes may be needed and would obvious to those skilled in the art.

Figure 11:
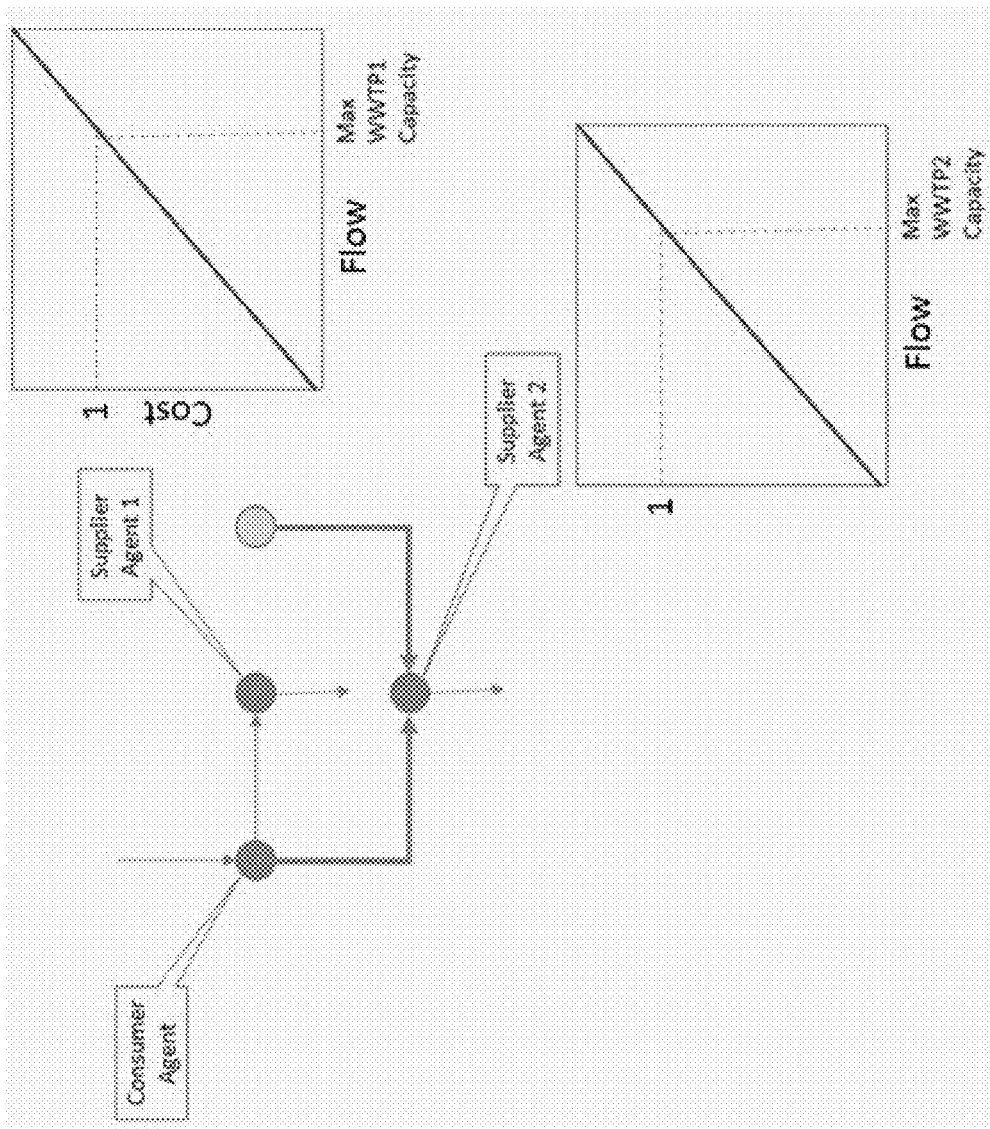
FIG. 11 shows illustrative agent supply rules.

With this formulation, the optimal supply curves may be determined for the time-shift model. In this case the treatment plants are the supplying assets and the gate is the control asset. The control agent has a control agent that is able to measure the flow coming into it. Illustrative supply curves are shown in FIG. 11. The supplying agents (WWTP1 and WWTP2) are able to measure the flow of water coming to them. Each of the supplying agents has a supply curve. In this example, the cost at each treatment plant increases proportionally with the amount flow the plant receives. A nominal cost of 1 is used at both plants to indicate that the plant is used at maximum capacity. Note that the maximum capacity of each plant may be different. Note that this does not mean that the control agent would send equal flows to each treatment plant. Nor does it mean that the control agent will send flows to the treatment plants proportionally to their capacities. The total flow received by each treatment plant (in the case of WWTP2, flows from the control structure and the uncontrolled basin) would be equal in proportion to their capacities.

Note that the flow meter also has an agent that is able to measure the flow coming into it, this agent does not participate in the optimization process as it cannot control flows. The flow meter agent is used in the real implementation to provide data to the control agent, so that the control agent can, with the help of the time-shift model, predict the hydraulic state and (with knowledge of the supply curve) the virtual cost of the WWTP2. That is, the flow meter agent provides predictive data on the flows arriving to WWTP2. This data is used in conjunction with the data from the control agent to determine the 2-hour forecasted data that will arrive to WWTP2.

One embodiment of each of the methods described herein is in the form of a computer program that executes on a processing system, e.g., a one or more processors or that form a part of an agent-based sewer control system. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A control system to control fluid flow through a sewer system having a plurality of supplying assets, said control system comprising:
   a first supplying agent associated with a first supplying asset of said plurality of sewer supplying assets, wherein said first supplying agent assigns a first virtual cost to any fluid flow incoming to said first supplying asset, wherein said first virtual cost is based on a state of said first supplying asset;
   a second supplying agent associated with a second supplying asset of said plurality of sewer supplying assets, wherein said second supplying agent assigns a second virtual cost to any fluid flow incoming to said second supplying asset, wherein said second virtual cost is based on a state of said second supplying asset;
   a control agent associated with a control asset, wherein said control asset is adapted to direct said fluid flow from said control asset to said first supplying asset and/or said second supplying asset;
   a computer network configured to accept said first virtual cost from said first supplying agent and said second virtual cost from said second supplying agent and to provide said first virtual cost and said second virtual cost to said control agent; and
   wherein said control agent directs flow from the said control asset to said first supplying asset and/or said second supplying asset by minimizing a cost based on the said first virtual cost, said second virtual cost and a forecasted time delay of fluid flow from said control asset to one or both of said first supplying asset and said second supplying asset.

2. The control system of claim 1, wherein said first supplying asset includes a first measuring device, and wherein said first supplying agent determines said state of said first supplying asset from an output of said first measuring device.

3. The control system of claim 1, wherein said second supplying asset includes a second measuring device, and wherein said second supplying agent determines said state of said second supplying asset from an output of said second measuring device.

4. The control system of claim 1, wherein said second supplying agent forecasts a future state of said second supplying asset.

5. The control system of claim 1, wherein said first supplying agent forecasts a future state of said first supplying asset.

6. The control system of claim 1, wherein said state of said first supplying asset or said state of said second supplying asset is a hydraulic state.

7. The control system of claim 6, wherein said hydraulic state includes at least one state selected from a group comprising hydraulic capacity, fluid flow rate, fluid level, volume of said supplying asset, resident time of said fluid in said supplying asset, humidity, or fluid storage capacity of said supplying asset.

8. The control system of claim 1, said state of said first supplying asset and/or said state of said second supplying asset is a water quality state.

9. The system of claim 1, wherein said control agent controls a valve of said control asset associated with said control agent, said valve directs fluid flow to said first supplying asset and/or said second supplying asset.

10. A method for controlling fluid flow through a sewer system, wherein said sewer system includes a control asset that provides flow to a first supplying asset and a second supplying asset, wherein said control asset has an associated control agent, wherein said first supplying asset has an associated first supplying agent, and wherein said second supplying asset has an associated second supplying agent, and wherein said control agent, said first supplying agent, and said second supplying agent are electronic devices in communication with each other over a network, said method comprising:
   determining, using said first supplying agent, a first state of said first supplying asset;
   calculating a first virtual cost of said first supplying asset from said determined first state;
   providing said first virtual cost to said control agent over said network;
   determining, using said second supplying agent, a second state of said second supplying asset;
   calculating a second virtual cost of said second supplying asset using said determined second state;
   providing said second virtual cost to said control agent over said network; and
   in said control agent, determining a control action of said control asset based on said first virtual cost and said second virtual cost received over said network and a forecasted time delay of fluid flow from said control asset to one or both of said first supplying asset and said second supplying asset;
   actuating said control asset, based on said control action from said control agent, to direct a flow to said first supplying asset and/or said second supplying asset; and
   wherein said determining said control action of said control asset includes determining a control action to minimize a cost based on said first virtual cost and said second virtual cost.

11. The method of claim 10, wherein said first asset includes a first measuring device, and wherein said determining said first state of said first supplying asset includes utilizing an output of said first measuring device.

12. The method of claim 10, wherein said second asset includes a second measuring device, and wherein said determining said second state of said second supplying asset includes utilizing an output of said second measuring device.

13. The method of claim 11, wherein said determining said second state said second supplying asset includes forecasting a future state of said second supplying asset.

14. The method of claim 10, wherein said determining said first state of said first supplying asset includes forecasting a future state of said first supplying asset.

15. The method of claim 10, wherein said state of said first supplying asset or said state of second supplying agent is a hydraulic state.

16. The method of claim 15, wherein said hydraulic state includes at least one state selected from a group comprising hydraulic capacity, fluid flow rate, fluid level, volume of said supplying asset, resident time of said fluid in said supplying asset, humidity, or fluid storage capacity of said supplying asset.

17. The method of claim 10, wherein said state of said first supplying asset or said state of said second supplying agent is a water quality state.

18. The method of claim 10, wherein said determining said control action of said control asset includes determining a control action to minimize a cost based on said first virtual cost and said second virtual cost.

19. The method of claim 10, wherein said actuating said control asset includes controlling a valve of said control asset to direct fluid flow to said first supplying asset and/or said second supplying asset.

* * * * *